(12) United States Patent
Kang et al.

(10) Patent No.: US 9,004,434 B2
(45) Date of Patent: Apr. 14, 2015

(54) CRADLE FOR SUPPORTING A PORTABLE DEVICE

(71) Applicant: Samsung Electronics Co. Ltd., Suwon-si, Gyeonggi-do (KR)

(72) Inventors: Yun-Cheol Kang, Gunpo-si (KR); Won-Tae Kim, Hwaseong-si (KR); Chung-Keun Yoo, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 13/777,558

(22) Filed: Feb. 26, 2013

(65) Prior Publication Data

US 2013/0292296 A1 Nov. 7, 2013

(30) Foreign Application Priority Data

May 2, 2012 (KR) .......................... 10-2012-0046267

(51) Int. Cl.
*A47G 1/10* (2006.01)
*B60R 7/08* (2006.01)
*H04M 1/04* (2006.01)
*B65D 25/10* (2006.01)

(52) U.S. Cl.
CPC . *B60R 7/08* (2013.01); *H04M 1/04* (2013.01); *B65D 25/10* (2013.01); *H04B 1/3877* (2013.01)

(58) Field of Classification Search
USPC .................. 248/316.4, 316.2, 316.1, 229.12, 248/229.22, 231.41, 316.6, 316.8, 313; 379/454, 455, 426
See application file for complete search history.

(56) References Cited

U.S. PATENT DOCUMENTS

| | | | | |
|---|---|---|---|---|
| 5,305,381 | A * | 4/1994 | Wang et al. | 379/455 |
| 5,788,202 | A * | 8/1998 | Richter | 248/316.4 |
| 5,836,563 | A * | 11/1998 | Hsin-Yung | 248/316.4 |
| 5,903,645 | A * | 5/1999 | Tsay | 379/455 |
| 6,229,891 | B1 * | 5/2001 | Chen | 379/446 |
| 6,959,899 | B2 * | 11/2005 | Yeh | 248/346.03 |
| 7,272,984 | B2 * | 9/2007 | Fan | 74/89.17 |
| 7,407,143 | B1 * | 8/2008 | Chen | 248/309.1 |
| 7,537,190 | B2 * | 5/2009 | Fan | 248/309.1 |
| 7,614,595 | B2 * | 11/2009 | Richter | 248/346.01 |
| 7,712,720 | B1 * | 5/2010 | Cheng et al. | 248/346.07 |
| 7,967,269 | B2 * | 6/2011 | Liu | 248/287.1 |
| 8,567,737 | B2 * | 10/2013 | Chen | 248/316.2 |
| 2002/0190176 | A1 * | 12/2002 | Louh | 248/316.4 |
| 2002/0191782 | A1 * | 12/2002 | Beger et al. | 379/454 |
| 2009/0294617 | A1 * | 12/2009 | Stacey et al. | 248/316.1 |

* cited by examiner

*Primary Examiner* — Nkeisha Smith
(74) *Attorney, Agent, or Firm* — Jefferson IP Law, LLP (57) ABSTRACT

A cradle includes a cradle body having a push button and a pair of holding arms facing each other in a compressed state by first elastic members in the cradle body, receding from each other while the push button is being pressed, and advancing toward each other while applying pressure to the holding arms to hold a portable body mounted on the cradle body. A driver is disposed in the cradle body and in interaction with the pair of holding arms.

14 Claims, 7 Drawing Sheets

CRADLE FOR SUPPORTING A PORTABLE DEVICE

PRIORITY

This application claims the benefit under 35 U.S.C. §119 (a) of a Korean patent application filed on May 2, 2012 in the Korean Intellectual Property Office and assigned Serial No. 10-2012-0046267, the entire disclosure of which is hereby incorporated herein by reference.

BACKGROUND OF THE INVENTION

1. Field of the Invention

The present invention relates to a cradle or a mount for a portable terminal. More particularly, the present invention relates to a cradle or mount for a portable terminal, installed in a vehicle.

2. Description of the Related Art

In general, portable terminals cover a broad range of devices including a cellular phone, a smart phone, a tablet PC, an MP3 player, and a Personal Multimedia Player (PMP). A cradle or mount is used to support such a popular portable terminal inclined or to keep the portable terminal stationary.

Cradles are categorized into a charging cradle for charging a portable terminal, a portable cradle for cradling a portable terminal in an inclined fashion so that a user may view a program on the portable terminal, and an in-vehicle cradle installed in a vehicle, for keeping a portable terminal stationary in the vehicle.

Among the cradle types, an in-vehicle cradle is provided with a pair of holding arms to hold a portable terminal The holding arms approach or recede from each other. When the holding arms advance to each other, they hold the portable terminal. Movement of the holding arms is enabled by a combination of a rack gear and a pinion gear. When the holding arms recede from each other, the rack gear or its teeth are exposed from the body of the mount, thus making the cradle or mount look less aesthetically pleasant.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address at least the above-mentioned problems and/or disadvantages and to provide at least the advantages described below. Accordingly, an aspect of the present invention is to provide a cradle or mount configured so that a driver for moving a pair of holding arms that hold a portable terminal in a cradle body does not expose a rack gear outside of the cradle body, thereby making the cradle or mount look more aesthetically pleasant.

Another aspect of the present invention is to provide a cradle configured so that holding arms recede from each other while a push button is being pressed in a cradle body.

Another aspect of the present invention is to provide a cradle for holding a portable terminal by manually moving far-spaced holding arms closer to each other.

Another aspect of the present invention is to provide a cradle for installation in a vehicle.

Another aspect of the present invention is to provide a cradle having a driver that includes only disc-type gears.

A further aspect of the present invention is to provide a cradle that enables fine movement of holding arms using two 2-stage gears.

In accordance with an aspect of the present invention, a cradle is provided. The cradle includes a cradle body having a push button, a pair of holding arms facing each other in a compressed state by first elastic members disposed in the cradle body, the pair of holding arms for moving away from each other while the push button is being pressed, and for moving toward each other while applying pressure to the holding arms to accommodate a portable body mounted on the cradle body, and a driver disposed in the cradle body in interaction with the pair of holding arms for moving the holding arms.

In accordance with another aspect of the present invention, a cradle for a vehicle is provided. The cradle includes a cradle body, a pair of holding arms provided in the cradle body, in a compressed state by first elastic members, a push button exposed in the cradle body, a latch connector disposed inside of the cradle body and supported by a second elastic member, the latch connector moving upon pressing of the push button, at least one gear connected to the push button and the holding arms, the at least one gear operating while the push button is being pressed, a latch disposed inside of the cradle body and supported by a third elastic member, the latch including one end brought into close contact with the latch connector and another end engaged with one of the at least one gear, for being removed from teeth of the at least one gear by the latch connector, while the push button is being pressed, and an interaction unit for converting a compressed force of the holding arms to a force that moves the holding arms, when a force transfer state is released by the latch upon pressing of the push button.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, the same drawing reference numerals will be understood to refer to the same elements, features and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
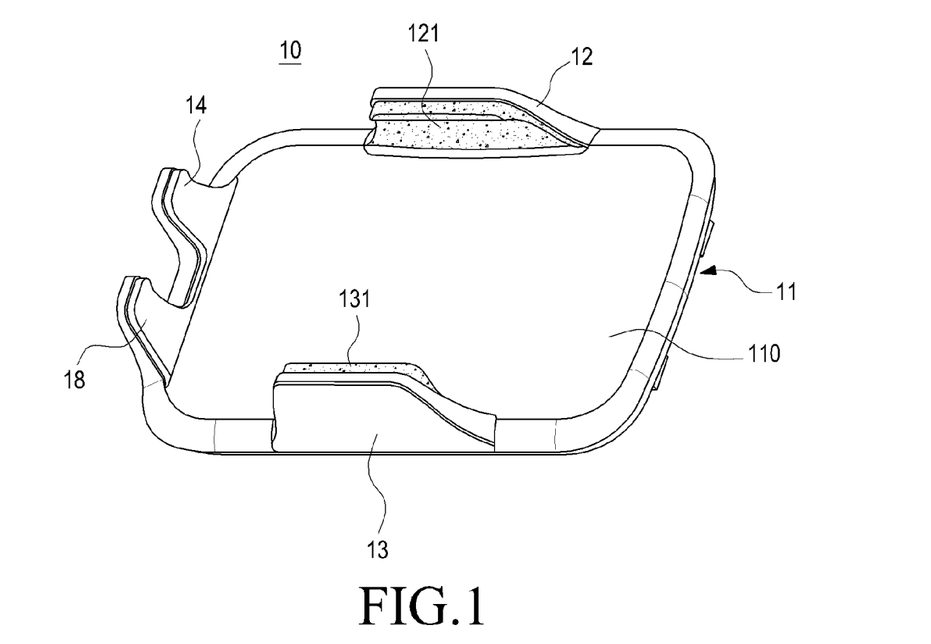
FIG. 1 is a perspective view of an exterior of a cradle or mount according to an exemplary embodiment of the present invention, seen from above.
Figure 2:
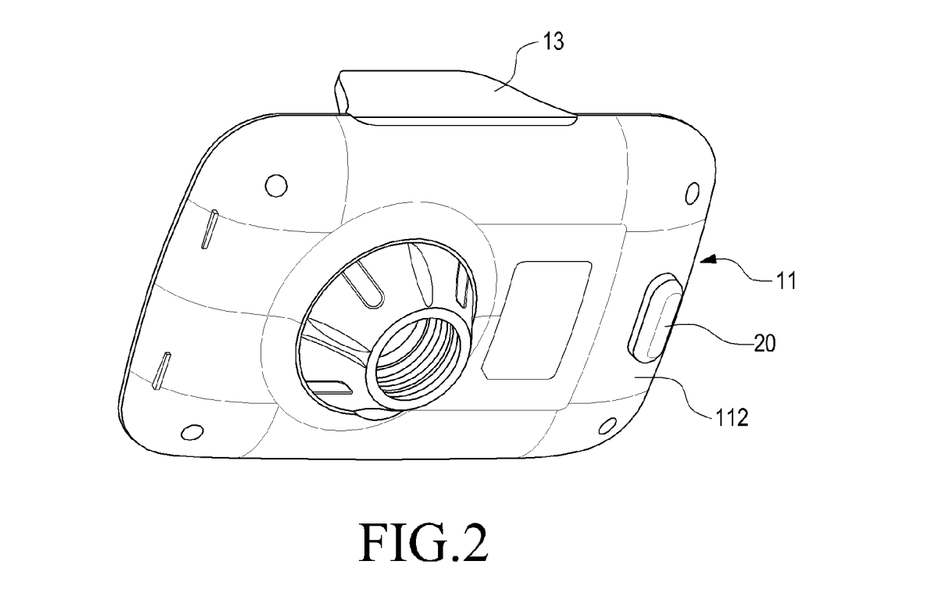
FIG. 2 is a perspective view of an exterior of the cradle or mount according to an exemplary embodiment of the present invention, seen from below.

FIGS. 1 and 2 are perspective views illustrating the exterior of a cradle according to an exemplary embodiment. Specifically, FIG. 1 is a perspective view of the exterior of the cradle or mount, according to an exemplary embodiment of the present invention, seen from above and FIG. 2 is a perspective view of the exterior of the cradle or mount, according to an exemplary embodiment of the present invention, seen from below.

Referring to FIGS. 1 and 2, a cradle 10 holds a portable terminal stably, especially in a vehicle. A device for mounting the cradle 10 at a specific position of the vehicle is not shown. The cradle 10 is designed to hold a portable terminal that covers a broad range of portable devices including a cellular phone, an MP3 player, a Personal Multimedia Player (PMP), a smart phone, a Personal Digital Assistant (PDA), a tablet PC and the like.

The cradle 10 is configured in such a manner that while a push button 20 is being pressed, holding arms 12 and 13 recede from each other and are moved manually closer to each other, thereby holding a portable terminal placed in the cradle 10. For this configuration, the cradle 10 includes a driver disposed within a cradle body 11. The structure of the driver will be described later in greater detail.

When seen from the outside, the cradle 10 includes the cradle body 11 and a plurality of arms 12, 13, 14 and 18. A portable terminal (not shown) is placed on the cradle body 11 and thus the cradle body 11 is shaped substantially into a flat rectangle. The plurality of arms 12, 13, 14 and 18 are members for holding or supporting the portable terminal placed on the cradle body 11. Specifically, the arms 12, 13, 14 and 18 are one or more fixing arms 14 and 18 and a pair of holding arms 12 and 13. The cradle body 11 has four side ends, specifically upper, lower, left, and right side ends. The cradle 10 is provided, at the lower side end thereof, with the two fixing arms 14 and 18 and at the left and right side ends thereof, with the two holding arms 12 and 13 respectively. The holding arms 12 and 13 can move closer to each other or farther from each other. The fixing arms 14 and 18 support the portable terminal placed on the cradle body 11 and the holding arms 12 and 13 hold the portable terminal placed on the cradle body 11. A structure related to movement of the holding arms 12 and 13 will be described later.

The fixing arms 14 and 18 and the holding arms 12 and 13 protrude from the cradle body 11 substantially in a vertical direction, that is, the fixing arms 14 and 18 and the holding arms 12 and 13 protrude upward from a top surface 110 of the cradle body 11. The fixing arms 14 and 18 are molded integrally with the cradle body 11 and the holding arms 12 and 13 are assembled to the cradle body 11.

The cradle body 11 includes the push button 20 on its bottom surface 112. As described later, while the push button 20 is being pressed, the holding arms 12 and 13 move.

The exterior structure of the cradle 10 has been described above. Now an internal structure of the cradle 10 will be described below.

Figure 3:
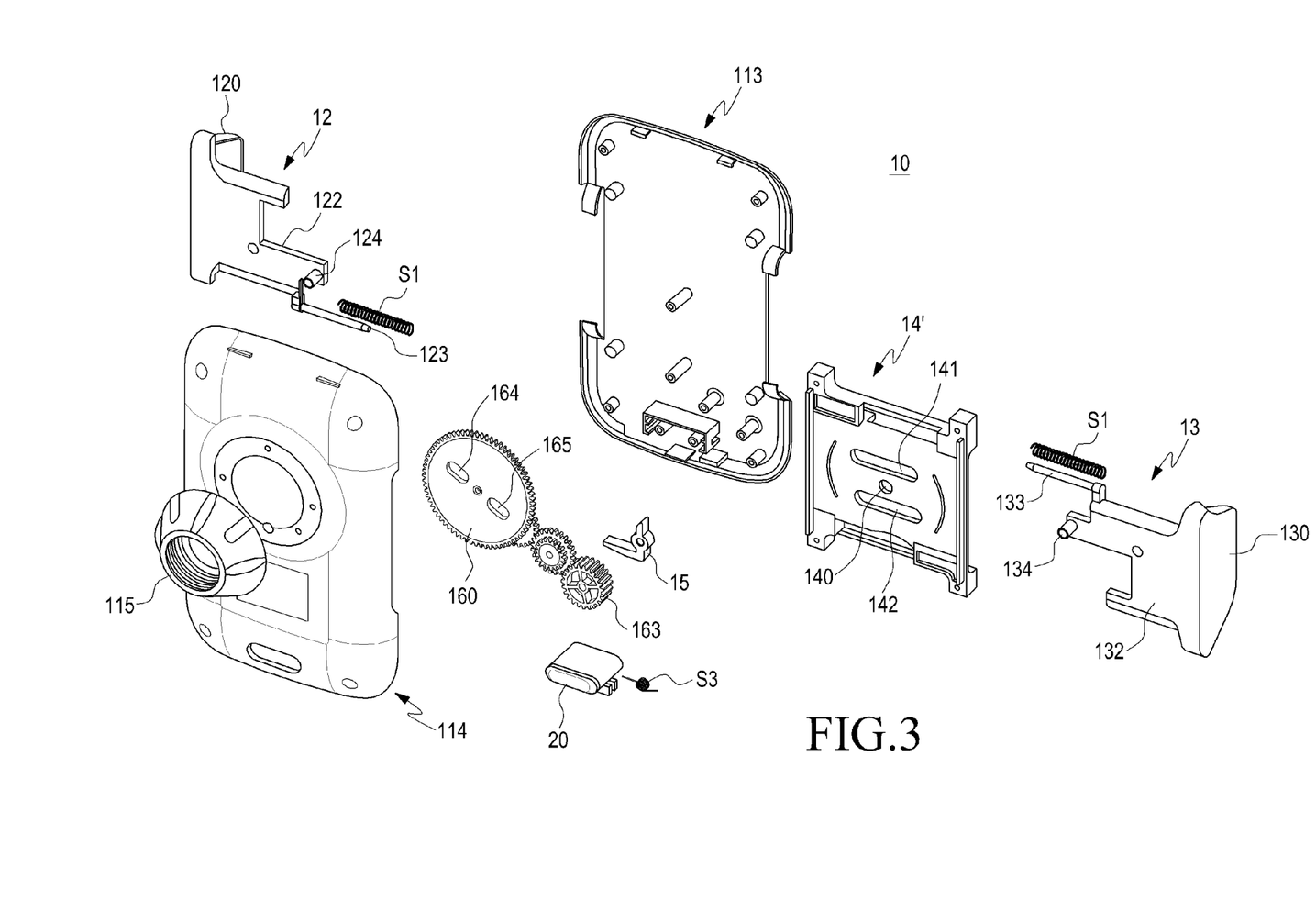
FIG. 3 is an exploded perspective view illustrating the structure of the cradle according to an exemplary embodiment of the present invention.
Figure 4:
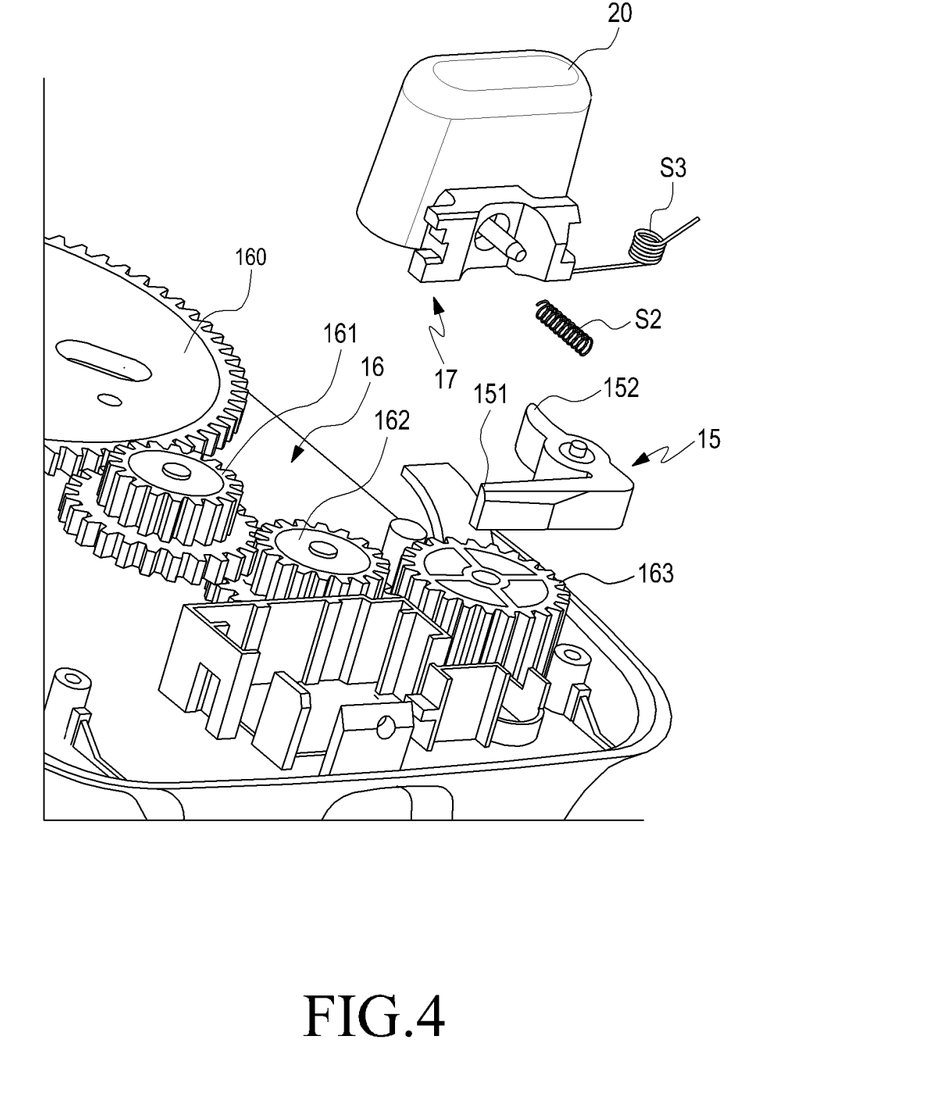
FIG. 4 is an exploded perspective view illustrating a latch and a driver in the cradle according to an exemplary embodiment of the present invention.
Figure 5:
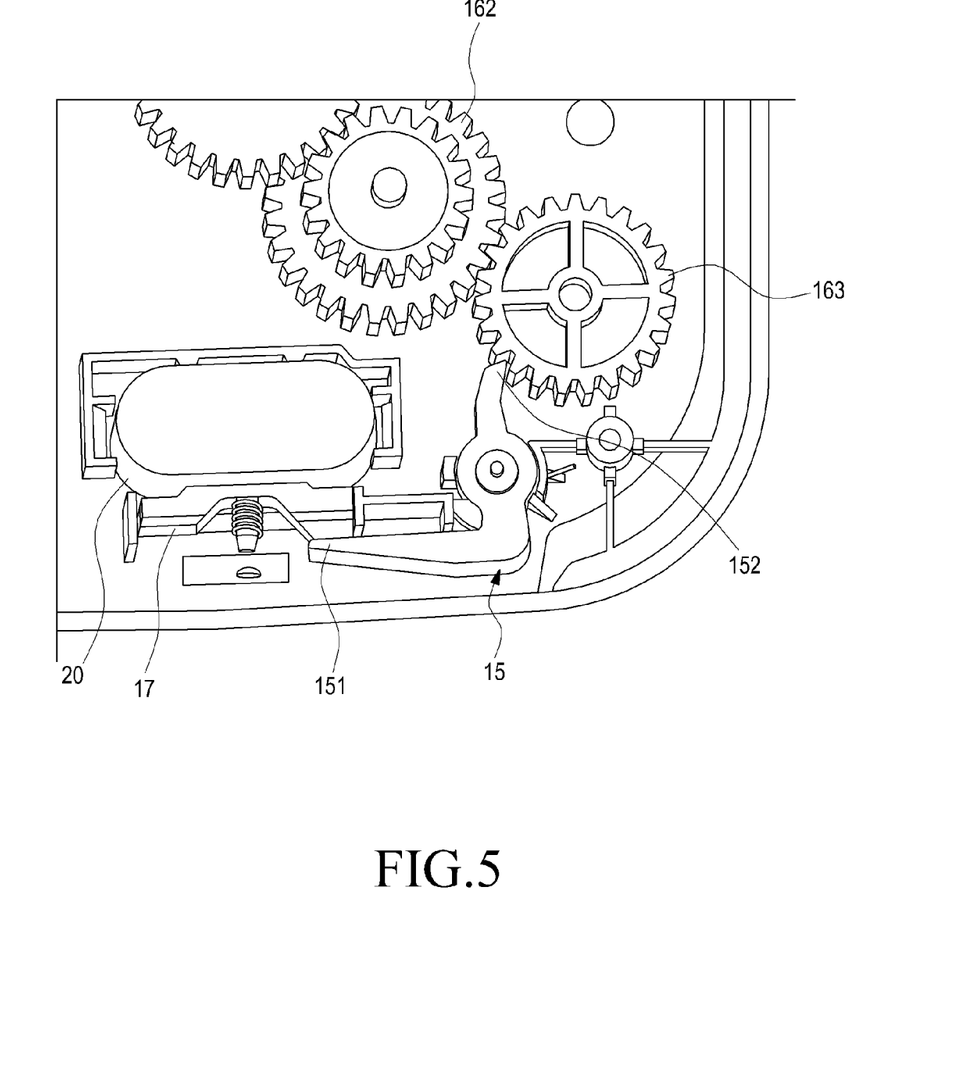
FIG. 5 is a view illustrating interaction between the latch and the driver, specifically engagement between the other end of the latch and a stop gear in the cradle according to an exemplary embodiment of the present invention.
Figure 6:
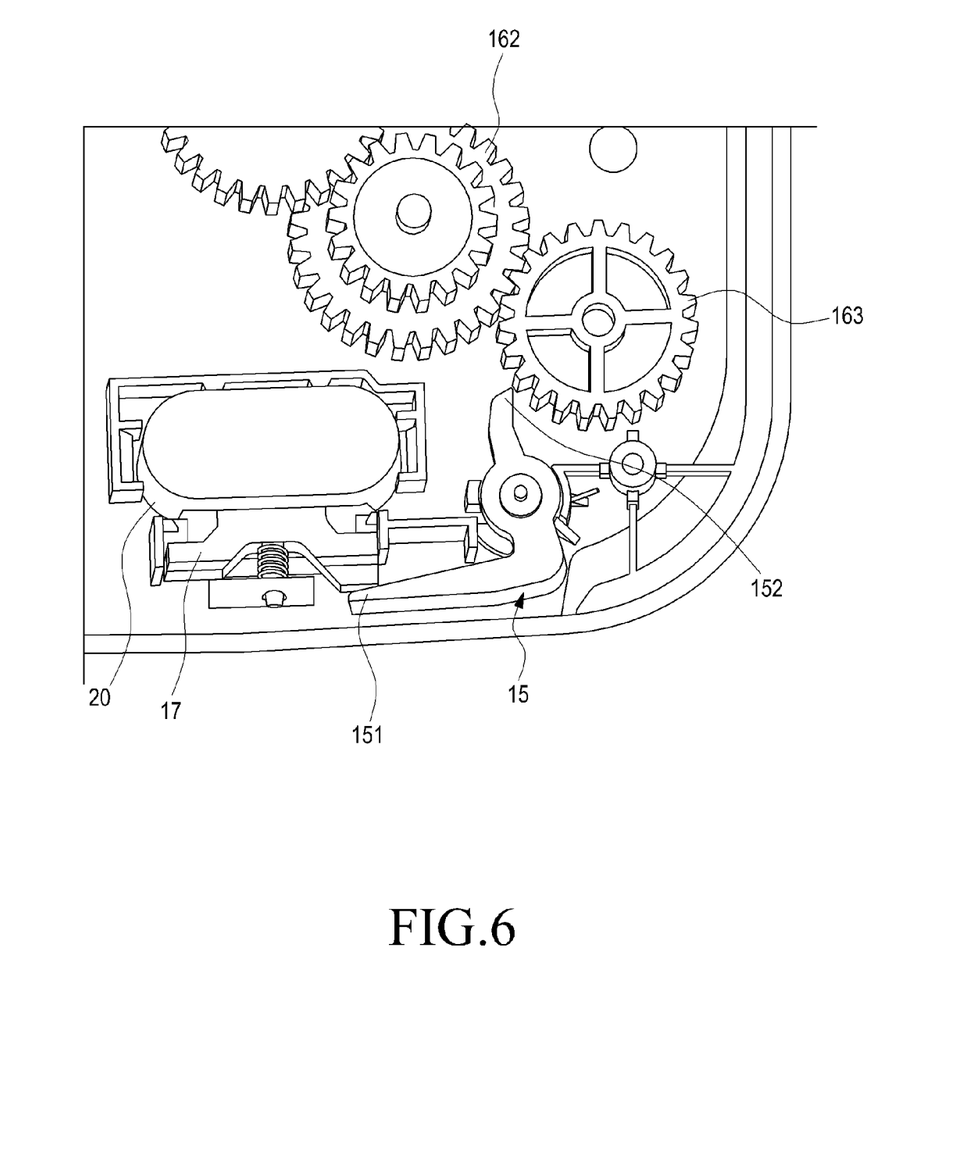
FIG. 6 is another view illustrating interaction between the latch and the driver, specifically removal of the other end of the latch from the stop gear in the cradle according to an exemplary embodiment of the present invention.

With reference to FIGS. 3, 4 and 5, the structures of the cradle body 11 and the holding arms 12 and 13 in the cradle 10 will be described. The cradle body 11 is formed by engaging a base 113 with a housing 114. The base 113 includes a plurality of rotation shafts for gears. The base 113 further includes a structure for allowing the push button 20, a latch connector 17, and a latch 15 to be engaged with the base 113. The housing 114 includes a connector 115 for connecting the cradle 10 to a device (not shown) that will install the cradle 10 in the vehicle.

The holding arms 12 and 13 face each other with respect to the cradle body. The holding arm 12 includes a vertical portion 120 and a horizontal portion 122, whereas the holding arm 13 includes a vertical portion 130 and a horizontal portion 132. The vertical portions 120 and 130 are substantially perpendicular to the horizontal portions 122 and 132, respectively. The vertical portions 120 and 130 are members which substantially protrude from the cradle body, for holding a portable terminal placed on the cradle body. The horizontal portions 122 and 132 are extended horizontally from bottom ends of the vertical portions 120 and 130, for retracting into and extending from both side ends of the cradle body in interaction with the later-described driver. The vertical portions 120 and 130 include holders (121 and 131 in FIG. 1) on their inner surfaces, that is, on their facing surfaces. Preferably, but not necessarily, the holders 121 and 131 are formed of an elastic material such as rubber or silicon. The holding arms 12 and 13 include rods 123 and 133 around which first elastic members S1 are compressed or pulled, and first and second force transfer shafts 124 and 134. The first and second force transfer shafts 124 and 134 protrude from the horizontal portions 122 and 132, forming an interaction unit in engagement with first and second guide openings 141 and 142 and third and fourth guide openings 164 and 165, which will be described later.

The holding arms 12 and 13 are mounted on the cradle body, with the first elastic members S1 compressed against the holding arms 12 and 13. Especially, the holding arms 12 and 13 are mounted to a guide unit 14', with the first elastic members S1 compressed. That is, the coil springs are compressed. The holding arms 12 and 13 are kept in the compressed state by the driver (the latch 15).

The guide unit 14' is mounted at the center of the cradle body 11, with the holding arms 12 and 13 in the compressed state, for guiding movement of the holding arms 12 and 13. The guide unit 14' includes a center opening 140 and the first and second guide openings 141 and 142. A rotation shaft is inserted into the center opening 140 and the first and second guide openings 141 and 142 are formed symmetrically with respect to the center opening 140, elongated to a predetermined length.

To move the holding arms 12 and 13, the cradle 10 includes the interaction unit, the latch 15, the latch connector 17, and the driver. While the push button 20 is being pressed, the interaction unit drives the driver, thereby converting the compressed force of the holding arms 12 and 13 to a force that makes the holding arms 12 and 13 recede from each other. For this operation, the interaction unit includes the first and second force transfer shafts 124 and 134 and the first and second openings 141 and 142.

Referring to FIGS. 3 to 6, the driver includes the latch 15 and a force transferer 16, for moving the holding arms 12 and 13. The latch 15 is disposed so that it may interact with the push button 20 by the latch connector 17. Upon pressing of the push button 20, the latch 15 rotates, thus driving the force transferer 16. As the push button 20 returns to its original position, the latch 15 stops the driver.

When the push button 20 is pressed, the latch connector 17 interacts with the push button 20. Upon pressing of the push button 20, the latch connector 17 moves and pushes one end of the latch 15. The latch connector 17 is supported by a second elastic member S2, preferably a compressed coil spring.

The force transferer 16 includes a plurality of gears. Specifically, the force transferer 16 includes a disc gear 160, one or more connection gears 161 and 162 (only one connection gear is shown in FIG. 3), and a stop gear 163. The disc gear 160 is mounted to the guide unit 14' including the third and fourth guide openings 164 and 165 for allowing the first and second force transfer shafts 124 and 134 to be inserted thereinto. The connection gears 161 and 162 are 2-stage gears. However, the connection gears 161 and 162 are not limited thereto and other types of state gears can be utilized. In the drawings, two 2-stage gears are used. One 2-stage gear 161 is engaged with the disc gear 160, while the other 2-stage gear 162 is engaged with the stop gear 163. The stop gear 163 is installed in interaction with the latch 15 and thus is driven or stopped depending on whether the stop gear 163 is engaged with or removed from the latch 15.

The latch 15 is rotatably disposed, supported by a third elastic member S3. The latch 15 has one end 151 brought into close contact with the latch connector 17 and another end 152 engaged with teeth of the stop gear 163. While the push button 20 is being pressed, the other end 152 of the latch 15 is removed from the teeth of the stop gear 163. When the push button 20 is not pressed, the other end 152 of the latch 15 is kept engaged with the teeth of the stop gear 163. With the other end 152 of the latch 15 engaged with the teeth of the stop gear 163, the gears 161, 162 and 163 are stopped. The stop gear 163 engaged with the other end 152 of the latch 15 is rotatable only in one direction (a clockwise direction), not in the reverse direction (a counterclockwise direction) because of the shape of the other end 152 of the latch 15 and the engagement state between the other end 152 of the latch 15 and the teeth of the stop gear 163. As the stop gear 163 rotates in the one direction, the holding arms 12 and 13, which have receded from each other, may advance toward each other manually.

Figure 7:
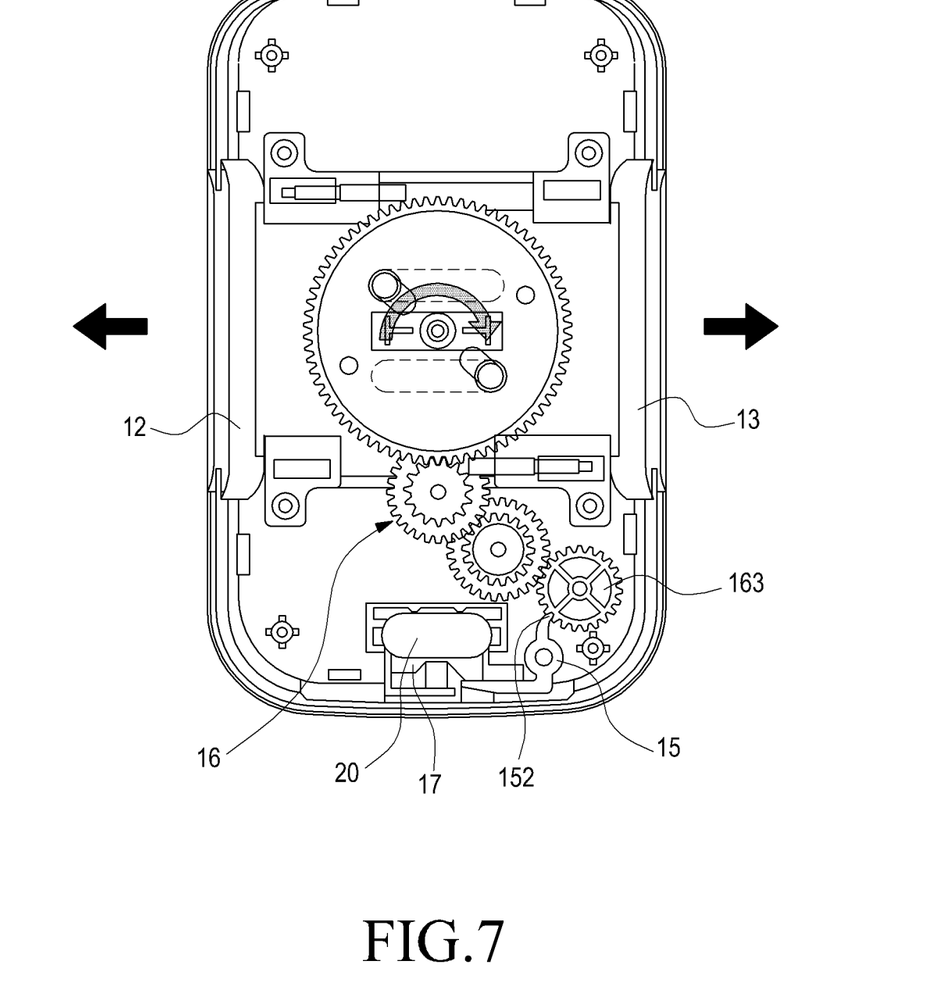
FIG. 7 is a plan view illustrating holding arms in a closed state in the cradle according to an exemplary embodiment of the present invention.
Figure 8:
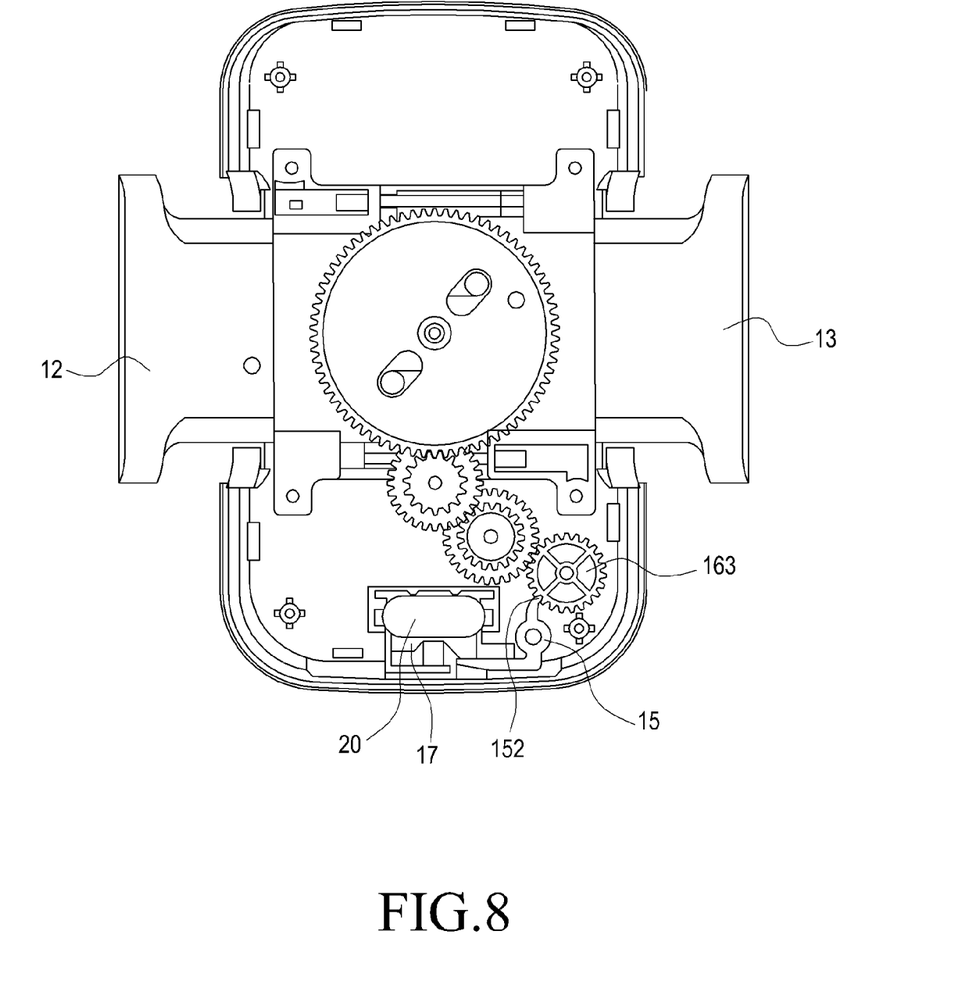
FIG. 8 is a plan view illustrating the holding arms in a moved state in the cradle according to an exemplary embodiment of the present invention.

Referring to FIGS. 7 and 8, movement of the holding arms 12 and 13 in the cradle will be described. In a closed state of the cradle 10, the holding arms 12 and 13 are compressed, the other end 152 of the latch 15 is engaged with the teeth of the stop gear 163, and the push button 20 is not pressed. When the push button 20 is pressed, the latch connector 17 moves, thus rotating the latch 15. Then the other end 152 of the latch 15 is removed from the teeth of the stop gear 163. At the same time, the force transferer 16 is driven and the interaction unit converts the compressed force of the holding arms 12 and 13 to a force that moves the holding arms 12 and 13 in opposite directions so that the holding arms 12 and 13 recede from each other. In the meantime, when the push button 20 returns to its original position, the latch 15 rotates so that the other end 152 of the latch 15 is engaged with the teeth of the stop gear 163. Therefore, the stop gear 163 comes to a halt and then the holding arms 12 and 13 also stop.

Consequently, while the push button 20 is being pressed, the holding arms 12 and 13 of the cradle 10 recede from each other. When the holding arms 12 and 13 apart from each other are moved toward each other manually, they hold a portable terminal mounted on the cradle body. The holding arms 12 and 13 may make continuous or stepwise movement. While the push button 20 is being pressed, the holding arms 12 and 13 recede from each other. On the other hand, when the push button 20 is pressed intermittently, the holding arms 12 and 13 are moved stepwise.

As is apparent from the above description of the exemplary embodiments, the cradle 10 looks sophisticated because a rack gear exposed outward from the cradle body is not used. Especially, the cradle is configured in such a manner that while the push button is being pressed, the holding arms recede from each other and when the holding arms are manually moved, the holding arms hold a portable terminal on the cradle body. Therefore, a portable terminal can be cradled in the cradle conveniently.

While the present invention has been shown and described with reference to exemplary embodiments thereof, it will be understood by those skilled in the art that various changes in form and details may be made therein without departing from the spirit and scope of the present invention as defined by the following claims and their equivalents.

What is claimed is:
1. A cradle comprising:
a cradle body having a push button;
a pair of holding arms facing each other in a compressed state by first elastic members disposed in the cradle body, the pair of holding arms for moving away from each other while the push button is being pressed and for moving toward each other while applying pressure to the holding arms to accommodate a portable body mounted on the cradle body; and
a driver disposed in the cradle body in interaction with the pair of holding arms for moving the holding arms, the driver comprising a latch disposed in interaction with the push button, for driving the driver by allowing the driver to rotate while the push button is being pressed or stopping the driver when the push button returns to an original position and a latch connector supported by a second elastic member, the latch connector for interacting with the push button when the push button is pressed, wherein upon pressing of the push button, the latch connector is moved and rotates the latch, wherein each of the holding arms comprises:
  a vertical portion protruding from the cradle body, for holding a portable terminal mounted on the cradle body; and
  a horizontal portion extended horizontally from the vertical portion, for retracting into and extending from the cradle body in interaction with the driver,
wherein the cradle body further comprises a guide unit disposed inside of the cradle body, wherein the pair of holding arms are connected to the driver in the compressed state in the guide unit by an interaction unit,
wherein the interaction unit comprises:
  first and second force transfer shafts provided at the horizontal portions; and
  first and second guide openings formed in the guide unit, for allowing the first and second force transfer shafts to be inserted thereinto, and
wherein the driver further comprises a force transferer including:
  a plurality of disc-type gears connected to the interaction unit, for operating or not operating the driver depending on whether the force transferer is connected to the latch;
  third and fourth guide openings for allowing the first and second force transfer shafts to be inserted thereinto;
  a disc gear disposed facing the guide unit;
  at least one 2-stage connection gear engaged with the disc gear; and
  a stop gear disposed in interaction with the latch, for operating or not operating depending on whether the stop gear is engaged with or removed from the latch.

2. The cradle of claim 1, wherein while the push button is being pressed, the interaction unit rotates the driver, converting a compressed force of each of the holding arms into a force that moves the holding arms away from each other.

3. The cradle of claim 1, wherein the latch is supported by a third elastic member and the latch comprises one end brought into close contact with the latch connector and another end engaged with teeth of the stop gear, and while the push button is being pressed, the another end of the latch is removed from the teeth of the stop gear.

4. The cradle of claim 3, wherein the stop gear engaged with the another end of the latch can rotate in a clockwise direction and cannot rotate in a counterclockwise direction.

5. The cradle of claim 1, wherein the holding arms comprise first and second holders formed of rubber or silicon on facing inner surfaces of the holding arms.

6. The cradle of claim 1, wherein the push button is exposed from a bottom surface of the cradle body.

7. A cradle for a vehicle, the cradle comprising:
  a cradle body;
  a pair of holding arms provided in the cradle body, in a compressed state by first elastic members;
  a push button exposed in the cradle body;
  a latch connector disposed inside of the cradle body and supported by a second elastic member, the latch connector moving upon pressing of the push button;
  at least one gear connected to the push button and the holding arms, the at least one gear operating while the push button is being pressed;
  a rotating latch disposed inside the cradle body and supported by a third elastic member, the latch comprising one end brought into close contact with the latch connector and another end engaged with one of the at least one gear, for being removed from teeth of the at least one gear by rotation by the latch connector, while the push button is being pressed; and
  an interaction unit for converting a compressed force of the holding arms to a force that moves the holding arms, when a force transfer state is released by the latch upon pressing of the push button, the interaction unit including:
    first and second force transfer shafts provided at the holding arms;
    first and second guide openings linearly extended and engaged with the first and second force transfer shafts; and
    third and fourth guide openings radially extended in the at least one gear and engaged with the first and second force transfer shafts.

8. The cradle of claim 7, wherein while the push button is being pressed, the holding arms automatically recede from the cradle body, and while applying pressure to the holding arms, the holding arms are moved toward the cradle body.

9. The cradle of claim 7, wherein when the push button is not pressed, the latch keeps the compressed holding arms stationary by stopping the at least one gear.

10. The cradle of claim 7, wherein the at least one gear is a disc-type gear.

11. The cradle of claim 7, wherein the interaction unit comprises a guide unit.

12. The cradle of claim 11, wherein the first and second guides are formed symmetrically with respect to a center of the guide unit and the third and fourth guide openings are formed symmetrically with respect to a center of the at least one gear.

13. The cradle of claim 7, wherein the at least one gear includes at least one 2-stage gear, for providing fine movement to the holding arms.

14. The cradle of claim 7, wherein the first and second elastic members are compressed coil springs and the third elastic member is a torsion spring.

* * * * *